No. 774,664. PATENTED NOV. 8, 1904.
H. C. HARRINGTON & W. M. TOWERS.
TRUCK.
APPLICATION FILED MAR. 10, 1904.
NO MODEL.
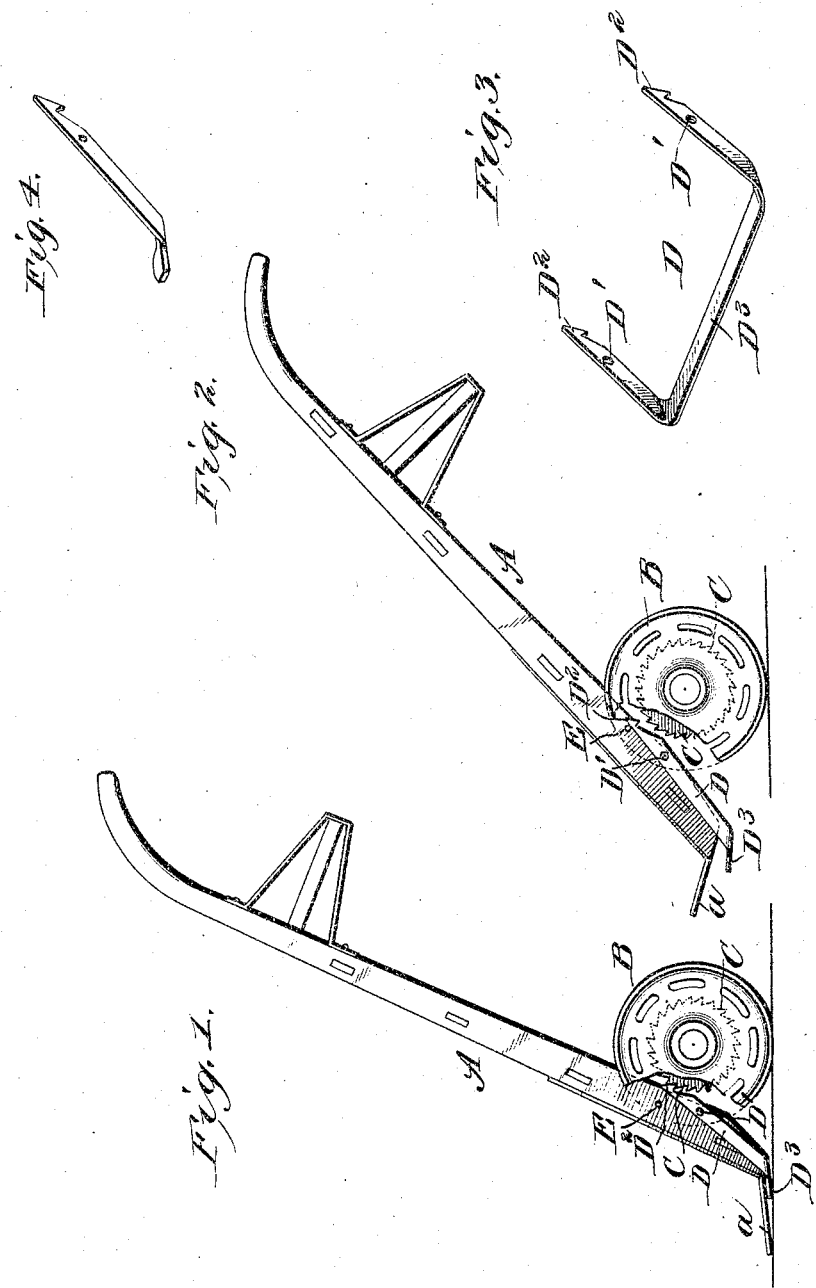
WITNESSES:
INVENTORS
Harry C. Harrington.
William M. Towers.
BY
ATTORNEYS No. 774,664. Patented November 8, 1904.

UNITED STATES PATENT OFFICE.

HARRY C. HARRINGTON AND WILLIAM M. TOWERS, OF ROME, GEORGIA.

TRUCK.

SPECIFICATION forming part of Letters Patent No. 774,664, dated November 8, 1904.

Application filed March 10, 1904. Serial No. 197,405. (No model.)

*To all whom it may concern:*

Be it known that we, HARRY C. HARRINGTON and WILLIAM M. TOWERS, citizens of the United States, residing at Rome, in the county of Floyd and State of Georgia, have made certain new and useful Improvements in Trucks, of which the following is a specification.

This invention is an improvement in hand-trucks, and has for an object to provide a novel construction to prevent the truck from slipping backward in applying a load to the truck; and the invention consists in certain novel constructions and combinations of parts, as will be hereinafter described and claimed.

In the drawings, Figure 1 is a side elevation of a truck embodying our invention with the wheels locked and the truck in position to receive a load. Fig. 2 is a side elevation of the truck with the wheels unlocked and the truck in position after the load has been raised from the floor. Fig. 3 is a detail perspective view of the wheel-locking lever, and Fig. 4 shows a somewhat-different form of lever from that shown in Fig. 3.

It is well known to shippers and other users of warehouse hand-trucks that it is a difficult matter to handle sacks of grain or heavy casks of merchandise with the ordinary truck from the fact that in loading the material the pressure backward is very great, and unless the truck is held in position by an extra hand it will frequently slip backward, dumping the load and causing the trouble to reload. Our improvement seeks to prevent any backward movement of the wheels when the truck is in position to receive the load and until the truck is adjusted out of such position toward a position for carrying the load.

The truck A is of ordinary construction, except as presently described. It comprises the frame to which are journaled the wheels B, a ratchet device C being provided in connection with the wheels, preferably by forming or securing a ratchet-ring to each of the wheels, as will be understood from the drawings.

The lock D is in the form of a lever pivoted at D' to the truck-frame, having a point or pawl $D^2$ at its upper end to engage with the ratchet device in connection with the wheels and extending at its lower end at $D^3$ in position to rest against the floor and having at such end a forward extension which underlies the front end $a$ of the truck and is pressed by such end of the truck firmly against the floor when the truck is raised to the position shown in Fig. 1. In this position it will be noticed the lever engages at one end with the ratchet device and at its other end with the floor or base in such manner as to lock the wheels from any rearward movement, thereby preventing a backward movement of the truck from any pressure while loading.

In Fig. 2 the truck is shown in position when loaded and ready for moving. A slight forward movement from the position shown in Fig. 1 has disengaged the lever from the ratchet devices, and the weight of the lower end of the lever has caused such end to drop down until the upper end of the lever abuts a stop E. The wheels are now entirely free, and the truck may be moved in any direction until it is necessary to unload. In unloading the truck the handles may be raised until the lower end of the lever D again comes in contact with the floor, when the truck will be locked until the load is dumped or otherwise removed. The invention is simple, can be inexpensively made and applied to trucks either in the building of same or to trucks already constructed, and will operate efficiently for the purpose for which it is designed.

Instead of connecting the opposite levers together, as shown in Fig. 3, so they will operate together, the said opposite levers may be made separate and operate independently, as will be understood from Fig. 4 of the drawings.

Having thus described our invention, what we claim as new, and desire to secure by Letters Patent, is—

1. The improvement in trucks comprising the truck-frame, the wheels, a ratchet device in connection with the wheels and the locking-lever arranged to engage said ratchet device and to abut the floor and to be moved by abutment with the floor or base into engagement with the ratchet device, substantially as set forth.

2. The combination of the truck-frame, the wheels, the ratchet-rings in connection with the wheels, and the pivoted lock device provided above its pivot with means to engage the ratchet-rings, and arranged at its lower end to engage with the floor substantially as set forth.

3. The truck-frame and its wheels and a ratchet device in connection with the wheels combined with a locking-lever pivoted between its ends, engaging with the ratchet devices and arranged at its lower end to engage with the floor or base, and a stop for limiting the movement of the lever when adjusted out of engagement with the ratchet devices.

4. The combination with the truck-frame, the wheels, the ratchet devices in connection with the wheels, the lever pivoted between its ends, and arranged above its pivot to engage the ratchet devices and at its lower end for engagement with the floor and having at such end a forwardly-projecting portion to underlie the front end of the truck-frame when the truck is adjusted to position to receive a load, substantially as set forth.

5. As a means for preventing a backward movement of a truck from pressure while loading, a ratchet device in connection with the truck-wheels, and a lock arranged to engage said ratchet device and for engagement with the floor and adapted for operation substantially as set forth.

HARRY C. HARRINGTON.
WILLIAM M. TOWERS.

Witnesses:
A. F. SELMAN,
S. F. MAGRUDER.